(12) United States Patent
Montgomery

(10) Patent No.: US 7,058,771 B2
(45) Date of Patent: Jun. 6, 2006

(54) SYSTEM AND METHOD FOR MANAGING MEMORY IN A SURVEILLANCE SYSTEM

(75) Inventor: Dennis L. Montgomery, Reno, NV (US)

(73) Assignee: Reno, NV (US)

( * ) Notice: Subject to any disclaimer, the term of this patent is extended or adjusted under 35 U.S.C. 154(b) by 322 days.

(21) Appl. No.: 09/991,487

(22) Filed: Nov. 21, 2001

(65) Prior Publication Data
US 2003/0097532 A1 May 22, 2003

(51) Int. Cl.
*G06F 12/00* (2006.01)
(52) U.S. Cl. .................. 711/159; 711/112; 711/160
(58) Field of Classification Search ............... 711/111, 711/112, 154, 159, 160, 113, 114
See application file for complete search history.

(56) References Cited

U.S. PATENT DOCUMENTS

| | | | | |
|---|---|---|---|---|
| 4,682,305 A * | 7/1987 | Ishikawa | ..................... | 711/111 |
| 4,841,366 A | 6/1989 | Katagiri et al. | ............. | 348/620 |
| 5,276,867 A * | 1/1994 | Kenley et al. | .............. | 707/204 |
| 5,394,531 A * | 2/1995 | Smith | .......................... | 711/136 |
| 5,432,919 A * | 7/1995 | Falcone et al. | ............. | 711/134 |
| 5,619,675 A * | 4/1997 | De Martine et al. | ........ | 711/133 |
| 5,901,246 A | 5/1999 | Hoffberg et al. | ............ | 382/209 |
| 5,943,687 A * | 8/1999 | Liedberg | .................... | 711/156 |
| 5,974,507 A * | 10/1999 | Arimilli et al. | ............. | 711/133 |
| 6,011,901 A | 1/2000 | Kirsten | ........................ | 386/123 |
| 6,317,808 B1 * | 11/2001 | Berenshteyn | ................ | 711/112 |
| 6,327,644 B1 * | 12/2001 | Beardsley et al. | .......... | 711/136 |
| 6,385,699 B1 * | 5/2002 | Bozman et al. | ............. | 711/133 |
| 6,421,766 B1 * | 7/2002 | Jones, Jr. | ..................... | 711/160 |
| 6,532,520 B1 * | 3/2003 | Dean et al. | ................. | 711/133 |
| 6,609,186 B1 * | 8/2003 | Veres et al. | ................. | 711/171 |
| 2003/0110357 A1 * | 6/2003 | Nguyen et al. | ............. | 711/136 |

FOREIGN PATENT DOCUMENTS

WO    WO 01/20489    3/2001

* cited by examiner

*Primary Examiner*—Brian R. Peugh
(74) *Attorney, Agent, or Firm*—Etreppid Technologies, LLC

(57) ABSTRACT

A control program controls a digital storage device which stores images from digital camera streams. The control program monitors the status of the digital storage device. When the storage device (or portion thereof allocated for image storage) becomes full and new information needs to be stored therein, the control program directs the storage device to delete information therein to make room for the new information. This is done based on various data parameters, such as the priority of individual messages or data units, the age of each message or data unit, and the like. For example, when information needs to be deleted from a digital storage device to make room for new information, older data of high priority cameras may be saved instead of newer data of low priority cameras. In this way, efficient use of the digital storage system can be made.

7 Claims, 2 Drawing Sheets

SYSTEM AND METHOD FOR MANAGING MEMORY IN A SURVEILLANCE SYSTEM

BACKGROUND OF THE INVENTION

1. Field of the Invention

The present invention is directed to a computer system and method for managing memory in a surveillance system. More particularly, it is directed to managing memory in a video surveillance system. Especially, it is directed to managing memory in such a system when the memory becomes fill or overflows.

2. Background of the Related Art

Surveillance systems are known in the art. In its simplest form, a surveillance system might essentially consist of an analog video camera hooked up to a remote video monitor as shown in FIG. 1A, or an audio device hooked to a speaker, although the camera may also contain audio as well. Using the camera for purposes of this discussion, the camera is pointed at a spot of interest, e.g., a front door, an automated teller machine, etc., and provides an image of that scene to the monitor. An operator watches the monitor to look for unusual or unauthorized behavior at the scene. If such activity is perceived, the operator takes appropriate action—identifying the individual, notifying security police, etc.

The system may have one or many cameras, each of which can be displayed in a predetermined area of the monitor. Alternatively, the operator may toggle through the scenes. Further, instead of one or more analog cameras, the system may use digital cameras such as CCD cameras and the like. Such digital cameras have the advantage of providing a high-quality, low-noise image when compared to analog images.

Another possible video surveillance arrangement is shown in FIG. 1B. This system uses multiple cameras connected to the monitor via a controller. The controller can multiplex several camera signals and provide them to the monitor. Also, it can control the positions of the cameras. The operator uses an input device such as a keyboard, joystick or the like to direct the controller to control the motion of the cameras so they point to particular areas within their range, track interesting features in the images, etc. It may also use the input device to control the controller to direct the controller to provide particular ones of the camera signals to the monitor.

FIG. 1C shows another arrangement of a video surveillance system. Here, a video recording device is connected to the camera outputs, the monitor input, or both. The video recording device, e.g., a video cassette recorder for analog cameras, can record the camera signals for archival, later review, and the like. Further, it can record images displayed on the monitor as evidence of activities taking place in the environments being inspected. For digital systems, the video storage device may be a digital storage device, a mass storage device such as a hard disk drive, or the like. When a hard disk drive is used, it may be a separate unit from the user controller and camera controller, or it may be part of an integrated system.

When the cameras are analog models, their signals may be stored on analog or digital storage devices. With an analog storage device or devices such as video cassette recorders, the camera signal or signals are stored on videotape much like a television signal. In a system using a digital storage device, e.g., a digital surveillance system or an analog camera system which digitizes the camera signal, the camera images are pixilated and stored in the digital storage device as data files. The files may be uncompressed, or they may be compressed using a compression algorithm to maximize use of the storage space.

If camera images are continually stored in a digital storage device without any deletions, eventually the storage device (or the part of it allocated for camera image storage) will become full. At that point, the stored data and incoming data must be managed to accommodate the new data.

SUMMARY OF THE INVENTION

In view of the above problem of the prior art, it is an object of the present invention to provide a system and method for managing digitally stored information, particularly digital images stored in a digital storage device.

The above object is achieved in one embodiment of the present invention by providing a control program which controls the digital storage device. The control program monitors the status of the digital storage device. When the storage device (or portion thereof allocated for image storage) becomes full and new information needs to be added, the control program directs the storage device to delete information therein to make room for the new information. This is done based on various data parameters, such as the priority of individual messages or data units, the age of each message or data unit, and the like. For example, when information needs to be deleted from a digital storage device to make room for new information, older data of high priority cameras may be saved instead of newer data of low priority cameras. In this way, efficient use of the digital storage system can be made.

BRIEF DESCRIPTION OF THE DRAWINGS

The invention will be more easily understood in view of the following detailed description and the appended drawings, in which.

DETAILED DESCRIPTION OF PRESENTLY PREFERRED EXEMPLARY EMBODIMENTS

Figure 1A:
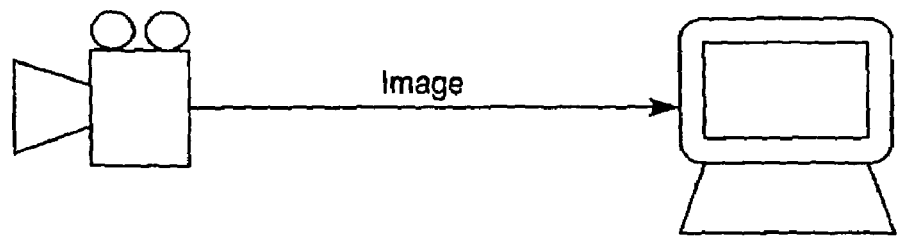
FIGS. 1A–1C show various video surveillance system arrangements.
Figure 1B:
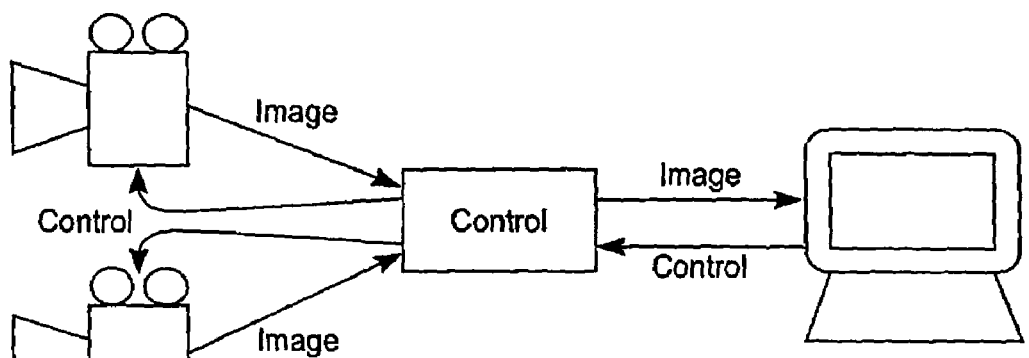
Figure 1C:
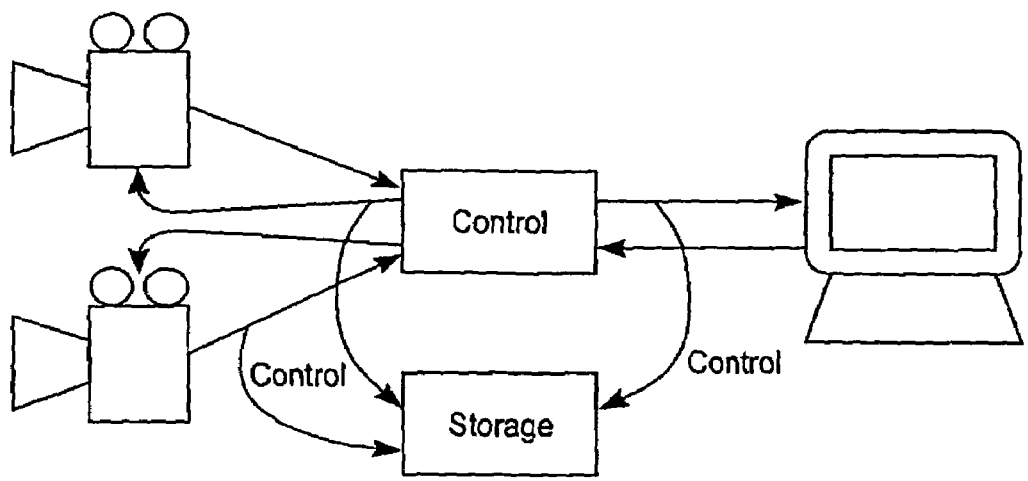
Figure 2:
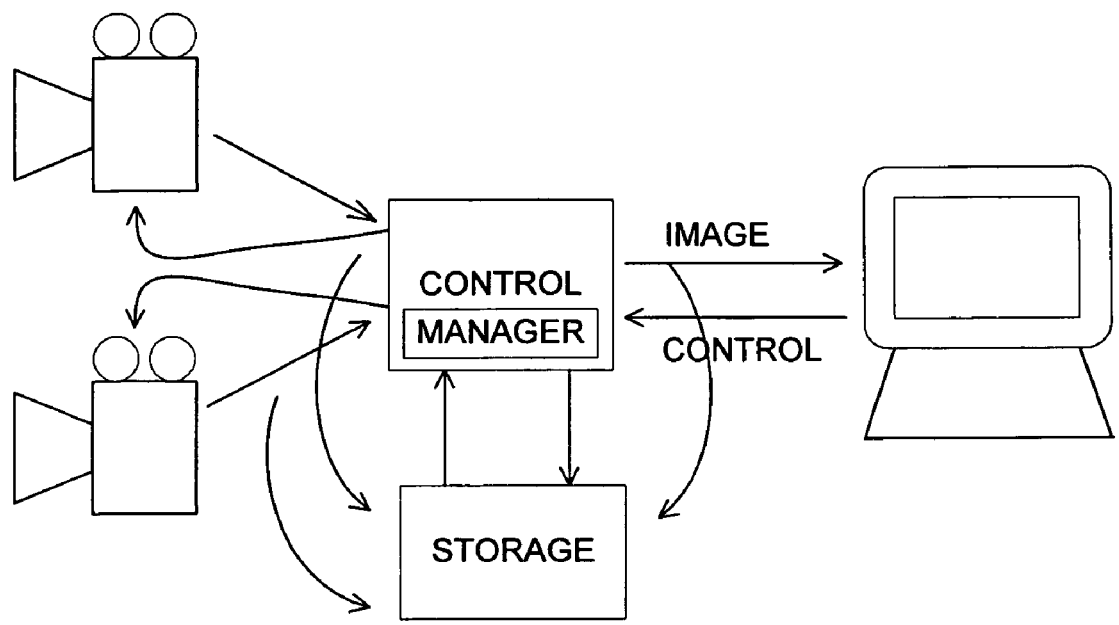
FIG. 2 shows a video surveillance system according to an embodiment of the present invention.

FIG. 2 shows a video surveillance system according to an embodiment of the present invention. This system is similar to the one shown in FIG. 1C, with the exception that in addition to controlling the positions of the cameras and supplying the camera signals to the monitor, the controller also manages information in the digital storage device.

Assuming the digital storage device is a hard drive system, many techniques are known for storing data therein. For purposes of discussion assume that the disk drive stores a table listing all of the data units, e.g., files, stored thereon, the size of each file, its date of creation, its date of last access, and the sector (or other unit as appropriate) at which storage of the data unit begins. Each segment of the data unit includes a link to the next sector of the data unit. Possibly, it also includes a link back to the previous sector. The final sector of the data unit points to a null value as the next sector. When link-backs are included, the first sector's link-back similarly points to a null value.

Assume that the controller has received an image to be stored on the hard disk drive, and as the status of the disk drive is monitored it is determined that the disk drive is full, or else has less free space than is required for storage of the image data. An indication is generated, which is based on the status of the disk drive being monitored, to indicate that some data must be deleted to make room for the new image data. One embodiment of the present invention scores individual data units based on their priority and age, and chooses data units for erasure in the order: low priority, old data; low priority, new data; high priority, new data; high priority, old data; low priority. In other words, assuming the table entry for this image associates a 1 or 0 with a Priority parameter of the image, 1 being high priority and 0 being low priority, and associates an age measurement from 0–255 with an Age parameter of the image, 0 being old and 255 being new, the controller can construct a score for the data unit as follows:

$$Score=256*Priority+Age$$

This will provide a score which can range from 0 (low priority, old data) through 255 (low priority, new data) and 256 (high priority, old data) to 511 (high priority, new data). This effectively groups the data units into four non-overlapping groups—high priority, new data; high priority, old data; low priority, new data; low priority, old data—in decreasing order. The controller can then, based on the file sizes associated with the images, select enough low-scoring data units for erasure so that there will be enough room for the new data. The controller can then instruct the hard disk unit to erase the selected files and store the new data therein.

This order of desirability—high priority, new data; high priority, old data; low priority, new data; low priority, old data—is useful in situations where it is most important to retain image data that has high priority. Other arrangements may be used in other situations—for example, the score $$Score=256*Priority+Age$$

where 1 is high priority and 0 is low priority, and associates an age measurement from 0–255 with the image, 0 being new and 255 being old, will generate scores of desirability in the order low priority, new data; low priority, old data; high priority, new data; high priority, old data, with the last being the most desirable. This ordering might be useful when old data is more important than new data, e.g., in a data archival situation. Alternatively, the score $$Score=256*Priority+Age$$

where 1 is low Priority and 0 is high Priority, and associates an Age measurement from 0–255 with the image, 0 being new and 255 being old, produces an ordering in decreasing desirability of low priority, old data; low priority, new data; high priority, old data; high priority, new data.

Further, the score $$Score=256*Priority+Age$$

where 1 is low Priority and 0 is high Priority, and the Age measurement is from 0–255, 0 being old and 255 being new, produces an ordering in decreasing desirability of low priority, new data; low priority, old data; high priority, new data; high priority, old data.

Other arrangements are also possible. For example, rather than the Age parameter representing the age of creation of an image file as above, it could alternatively represent a time since the last access of the image.

Further, both creation age and access age could be used. Additionally, other parameters could also be used. For example, a score such as $$Score=512*Priority+256*Subject+Age$$

could be used where Subject could be 1 for the Vault and 0 for Stairwell, with Priority being 1 for high priority and 0 for low priority, and Age being 0 for old through 255 for new. This would order scores in the following way, from most desirable to least desirable: high priority, Vault, new; high priority, Vault, old; high priority, Stairwell, new; high priority, Stairwell, old; low priority, Vault, new; low priority, Vault, old; low priority, Stairwell, new; low priority, Stairwell, old. This scoring system would value images from Vault cameras more highly than images from the Stairwell.

Other numbering systems are of course possible. Further, the data units subject to potential erasure need not be limited to those already stored but may additionally include the unit intended to be stored. In this case, the new data unit may be designated for erasure—in which case, no erasure of stored information would be necessary. Also, rather than using two-valued parameters (0 and 1), the system may make use of parameters with more than two values. For example, the Priority parameter may have values for high, medium and low or a range such as 0–10, with 0 being the highest priority and 10 being the lowest priority.

The embodiments described above have been presented for purposes of explanation only, and the present invention should not be construed to be so limited. Variations on the present invention will become readily apparent to those skilled in the art after reading this description, and the present invention and appended claims are intended to encompass such variations as well.

What is claimed is:

1. A system for managing data units stored in a hard disk storage device, the system comprising:
   receiving means for receiving a new data unit to be stored in the storage device;
   monitoring means for monitoring the status of the storage device, and for generating an indication of whether there is enough free space in the storage device to store the new data unit;
   weighting means for, when the monitoring means indicates that there is not enough space in the storage device to store the new data, weighting data units stored in the storage unit according to a predetermined weighting system, wherein the weighting system weights the data units based on priority and age, and wherein the weighting system weights the data units in the order of high priority, new data; high priority, old data; how priority, new data; low priority, old data in terms of desirability to retain; and
   erasure means for deleting data units in order of weights until there is enough free space in the storage device to accommodate the new data unit.

2. The system of claim 1, wherein the weighting system weights the data units based on priority, subject matter and age.

3. The system of claim 1, wherein the weighting means references a data table and wherein the data table includes at least one weight value related to at least one data unit.

4. A method for managing data units stored in a long term storage device, the method comprising:
   receiving a new data unit to be stored in the storage device;
   receiving a new data unit to be stored in the storage device;
   monitoring the status of the storage device, and for generating an indication of whether there is enough free space in the storage device to store the new data unit;
   when there is not enough space in the storage device to store the new data, weighting data units stored in the storage unit according to a predetermined weighting system, the weighting system weighting the data units in the order of high priority, new data; high priority, old data; low priority, new data; low priority, old data in terms of desirability to retain; and deleting data units in order of weights until there is enough free space in the storage device to accommodate the new data unit.

5. The method of claim 4, wherein the weighting system weights the data units based on priority, subject matter and age.

6. The method of claim 4, wherein the predetermined weighting system weights the data units based on priority, subject matter and age.

7. The method of claim 4, wherein the step of weighting data units includes the step of generating at least one weight value to be stated in a weight data table.

* * * * *